United States Patent
Kim et al.

(10) Patent No.: US 10,402,692 B1
(45) Date of Patent: *Sep. 3, 2019

(54) LEARNING METHOD AND LEARNING DEVICE FOR FLUCTUATION-ROBUST OBJECT DETECTOR BASED ON CNN USING TARGET OBJECT ESTIMATING NETWORK ADAPTABLE TO CUSTOMERS' REQUIREMENTS SUCH AS KEY PERFORMANCE INDEX, AND TESTING DEVICE USING THE SAME

(71) Applicant: Stradvision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongbuk (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/254,162

(22) Filed: Jan. 22, 2019

(51) Int. Cl.
*G06K 9/00* (2006.01)
*G06K 9/62* (2006.01)
(Continued)

(52) U.S. Cl.
CPC ......... *G06K 9/6262* (2013.01); *G06K 9/6228* (2013.01); *G06K 9/6232* (2013.01);
(Continued)

(58) Field of Classification Search
CPC combination set(s) only.
See application file for complete search history.

(56) References Cited

U.S. PATENT DOCUMENTS 10,007,865 B1 * 6/2018 Kim .................. G06K 9/6231
10,169,679 B1 * 1/2019 Kim .................. G06K 9/6256
(Continued)

OTHER PUBLICATIONS

Badrinarayanan et al., SegNet: A Deep Convolutional Encoder-Decoder Architecture for Image Segmentation, IEEE Transactions on Pattern Analysis and Machine Intelligence, Dec. 2017.*
(Continued)

*Primary Examiner* — John B Strege
(74) *Attorney, Agent, or Firm* — Husch Blackwell LLP

(57) ABSTRACT

A method for learning parameters of an object detector by using a target object estimating network adaptable to customers' requirements such as KPI is provided. When a focal length or a resolution changes depending on the KPI, scales of objects also change. In this method for customer optimizable design, unsecure objects such as falling or fallen objects may be detected more accurately, and also fluctuations of the objects may be detected. Therefore, the method can be usefully performed for military purpose or for detection of the objects at distance. The method includes steps of: a learning device instructing an RPN to generate k-th object proposals on k-th manipulated images which correspond to (k−1)-th target region on an image; instructing an FC layer to generate object detection information corresponding to k-th objects; and instructing an FC loss layer to generate FC losses, by increasing k from 1 to n.

28 Claims, 7 Drawing Sheets
(3 of 7 Drawing Sheet(s) Filed in Color)

(51) Int. Cl.
*G06N 3/08* (2006.01)
*G06T 3/40* (2006.01)

(52) U.S. Cl.
CPC ......... *G06K 9/6256* (2013.01); *G06K 9/6261* (2013.01); *G06N 3/084* (2013.01); *G06T 3/40* (2013.01)

(56) References Cited

U.S. PATENT DOCUMENTS

| | | | | |
|---|---|---|---|---|
| 10,198,671 | B1* | 2/2019 | Yang | G06K 9/6269 |
| 10,223,614 | B1* | 3/2019 | Kim | G06K 9/6262 |
| 10,229,346 | B1* | 3/2019 | Kim | G06K 9/6262 |
| 2016/0148079 | A1* | 5/2016 | Shen | G06K 9/4628 |
| | | | | 382/157 |
| 2017/0011281 | A1* | 1/2017 | Dijkman | G06K 9/66 |
| 2017/0124409 | A1* | 5/2017 | Choi | G06N 3/0454 |
| 2017/0124415 | A1* | 5/2017 | Choi | G06N 3/08 |
| 2017/0169315 | A1* | 6/2017 | Vaca Castano | G06K 9/3233 |
| 2017/0206431 | A1* | 7/2017 | Sun | G06N 3/084 |
| 2018/0096457 | A1* | 4/2018 | Savvides | G06K 9/6267 |
| 2018/0137642 | A1* | 5/2018 | Malisiewicz | G06T 7/11 |
| 2018/0211403 | A1* | 7/2018 | Hotson | G06K 9/4604 |
| 2018/0268234 | A1* | 9/2018 | Yang | G06N 3/063 |
| 2019/0012548 | A1* | 1/2019 | Levi | G06K 9/00791 |
| 2019/0050681 | A1* | 2/2019 | Tate | G06K 9/6232 |
| 2019/0073553 | A1* | 3/2019 | Yao | G06K 9/46 |

OTHER PUBLICATIONS

Sun et al., Face detection using deep learning: an improved faster RCNN approach, Elsevier B.V., Mar. 2018.*
Ren et al., Faster R-CNN: Towards Real-Time Object Detection with Region Proposal Networks, 2015.*
Du et al., Fused DNN: A deep neural network fusion approach to fast and robust pedestrian detection, IEEE, 2017.*
Girshick et al., Fast R-CNN, 2015.*

* cited by examiner

US 10,402,692 B1

LEARNING METHOD AND LEARNING DEVICE FOR FLUCTUATION-ROBUST OBJECT DETECTOR BASED ON CNN USING TARGET OBJECT ESTIMATING NETWORK ADAPTABLE TO CUSTOMERS' REQUIREMENTS SUCH AS KEY PERFORMANCE INDEX, AND TESTING DEVICE USING THE SAME

FIELD OF THE DISCLOSURE

The present disclosure relates to a method for learning parameters of a fluctuation-robust object detector by using a target object estimating network adaptable to custormers' requirements such as key performance index; and more particularly, to the method for learning the parameters of the object detector by the target object estimating network, including steps of: (a) if at least one training image is acquired, (i) instructing one or more convolutional layers to generate at least one first feature map by applying one or more convolution operations to at least one first manipulated image corresponding to the training image, (ii) instructing an RPN to generate one or more first object proposals corresponding to each of one or more first objects in the first manipulated image by using the first feature map, (iii) instructing a pooling layer to apply one or more pooling operations to each region, corresponding to each of the first object proposals, on the first feature map, to thereby generate at least one first pooled feature map, (iv) instructing an FC layer to apply at least one fully connected operation to the first pooled feature map, to thereby generate first object detection information corresponding to the first objects, and (v) instructing an FC loss layer to generate one or more first FC losses by referring to the first object detection information and its corresponding GT, to thereby learn at least part of parameters of the FC layer and the convolutional layers by backpropagating the first FC losses; and (b) (i) instructing the target object estimating network to search for a (k−1)-th target region, corresponding to an area where at least one target object is estimated as located, on a (k−1)-th manipulated image, by referring to one or more (k−1)-th object proposals on the (k−1)-th manipulated image, (ii) if a k-th manipulated image is acquired which corresponds to the (k−1)-th target region on a resized training image or the training image, instructing the convolutional layers to apply the convolution operations to the k-th manipulated image, to thereby generate a k-th feature map, (iii) instructing the RPN to generate one or more k-th object proposals corresponding to each of one or more k-th objects on the k-th manipulated image by referring to the k-th feature map, (iv) instructing the pooling layer to apply the pooling operations to each region, corresponding to each of the k-th object proposals, on the k-th feature map, to thereby generate at least one k-th pooled feature map, (v) instructing the FC layer to apply the fully connected operation to the k-th pooled feature map, to thereby generate k-th object detection information corresponding to the k-th objects, and (vi) instructing the FC loss layer to generate one or more k-th FC losses by referring to the k-th object detection information and its corresponding GT, to thereby learn at least part of parameters of the FC layer and the convolutional layers by backpropagating the k-th FC losses, by increasing k from 2 to n, and a learning device, a testing method, and a testing device using the same.

BACKGROUND OF THE DISCLOSURE

In machine learning, a convolutional neural network (CNN, or ConvNet) is a class of deep, feed-forward artificial neural network that has successfully been applied to analyzing visual imagery.

The CNN-based object detector may (i) instruct a convolutional layer to apply convolution operations to an input image, to thereby generate a feature map corresponding to the input image, (ii) instruct an RPN (Region Proposal Network) to identify proposals corresponding to an object in the input image by using the feature map, (iii) instruct a pooling layer to apply at least one pooling operation to the area on the the feature map corresponding to the identified proposals, to thereby generate a pooled feature map, and (iv) instruct an FC (Fully Connected) layer to apply at least one fully connected operation to the acquired pooled feature map to output class information and regression information for the object, to thereby detect the object on the input image.

However, since the CNN-based object detector uses the feature map whose size is reduced from a size of the input image by the convolutional layer, although large-sized objects in the input image can be easily detected, it is difficult to detect a small-sized object in the input image.

As another example, it is possible to detect the small-sized object by using a resized image obtained by enlarging the input image. In this case, however, the amount of computation by the object detector tremendously increases, thereby deteriorating the performance of the object detector.

Accordingly, the inventors of the present disclosure propose a learning method, a learning device for efficiently detecting objects with various sizes in the input image with less computational time, and a testing method and a testing device using the same are disclosed herein as well.

SUMMARY OF THE DISCLOSURE

It is an object of the present disclosure to solve all the aforementioned problems.

It is another object of the present disclosure to provide an object detector based on a CNN capable of efficiently detecting objects in an image without regard to their sizes.

It is still another object of the present disclosure to provide the object detector based on the CNN capable of detecting small-sized objects on the image without additional computational load.

In accordance with one aspect of the present disclosure, there is provided a method for learning parameters of an object detector by using a target object estimating network, including steps of: (a) a learning device, if at least one training image is acquired, (i) instructing one or more convolutional layers to generate at least one first feature map by applying one or more convolution operations to at least one first manipulated image corresponding to the training image, (ii) instructing an RPN to generate one or more first object proposals corresponding to each of one or more first objects in the first manipulated image by using the first feature map, (iii) instructing a pooling layer to apply one or more pooling operations to each region, corresponding to each of the first object proposals, on the first feature map, to thereby generate at least one first pooled feature map, (iv) instructing an FC layer to apply at least one fully connected operation to the first pooled feature map, to thereby generate first object detection information corresponding to the first objects, and (v) instructing an FC loss layer to generate one or more first FC losses by referring to the first object detection information and its corresponding GT, to thereby learn at least part of parameters of the FC layer and the convolutional layers by backpropagating the first FC losses; and (b) the learning device (i) instructing the target object estimating network to search for a (k−1)-th target region, corresponding to an area where at least one target object is estimated as located, on a (k−1)-th manipulated image, by referring to one or more (k−1)-th object proposals on the (k−1)-th manipulated image, (ii) if a k-th manipulated image is acquired which corresponds to the (k−1)-th target region on a resized training image or the training image, instructing the convolutional layers to apply the convolution operations to the k-th manipulated image, to thereby generate a k-th feature map, (iii) instructing the RPN to generate one or more k-th object proposals corresponding to each of one or more k-th objects on the k-th manipulated image by referring to the k-th feature map, (iv) instructing the pooling layer to apply the pooling operations to each region, corresponding to each of the k-th object proposals, on the k-th feature map, to thereby generate at least one k-th pooled feature map, (v) instructing the FC layer to apply the fully connected operation to the k-th pooled feature map, to thereby generate k-th object detection information corresponding to the k-th objects, and (vi) instructing the FC loss layer to generate one or more k-th FC losses by referring to the k-th object detection information and its corresponding GT, to thereby learn at least part of parameters of the FC layer and the convolutional layers by backpropagating the k-th FC losses, by increasing k from 2 to n.

As one example, at the step of (a), the learning device instructs an RPN loss layer to calculate one or more first RPN losses by referring to information on the first object proposals and their corresponding GTs, to thereby adjust at least part of parameters of the RPN by backpropagating the first RPN losses, and, at the step of (b), the learning device instructs the RPN loss layer to calculate one or more k-th RPN losses by referring to information on the k-th object proposals and their corresponding GTs, to thereby adjust at least part of the parameters of the RPN by backpropagating the k-th RPN losses.

As one example, at the step of (b), the learning device instructs the target object estimating network to (i) divide the (k−1)-th manipulated image into an M×N grid, (ii) generate at least one histogram representing the number of each corresponding proposals, among the (k−1)-th object proposals, per each cell of the grid, wherein each partial area or each whole area of said each corresponding proposals is present in its corresponding cell of the grid, and (iii) determine the (k−1)-th target region by using at least one region of a moving window, and wherein the at least one region has a largest value of summation of the histogram among all regions to be occupied by changing a location of the moving window.

As one example, at the step of (b), the learning device generates the resized training image by enlarging a size of the training image into a size larger than that of the first manipulated image, and crops at least one region, corresponding to the (k−1)-th target region, on the resized training image, to thereby generate the k-th manipulated image.

As one example, at the step of (b), the learning device crops at least one region, corresponding to the (k−1)-th target region, on the training image, and resizes the cropped region, to thereby generate the k-th manipulated image.

As one example, the k-th manipulated image is resized such that a size of the k-th manipulated image is larger than that of the (k−1)-th target region.

As one example, sizes of the first manipulated image to an n-th manipulated image are determined as same.

In accordance with another aspect of the present disclosure, there is provided a method for testing an object detector by using a target object estimating network, including steps of: (a) on condition that a learning device has performed processes of (1-1) instructing one or more convolutional layers to generate at least one first feature map for training by applying one or more convolution operations to at least one first manipulated image for training corresponding to at least one training image, (1-2) instructing an RPN to generate one or more first object proposals for training corresponding to each of one or more first objects for training in the first manipulated image for training by using the first feature map for training, (1-3) instructing a pooling layer to apply one or more pooling operations to each region, corresponding to each of the first object proposals for training, on the first feature map for training, to thereby generate at least one first pooled feature map for training, (1-4) instructing an FC layer to apply at least one fully connected operation to the first pooled feature map for training, to thereby generate first object detection information for training corresponding to the first objects for training, and (1-5) instructing an FC loss layer to generate one or more first FC losses by referring to the first object detection information for training and its corresponding GT, to thereby learn at least part of parameters of the FC layer and the convolutional layers by backpropagating the first FC losses; and (2-1) instructing the target object estimating network to search for a (k−1)-th target region for training, corresponding to an area where at least one target object for training is estimated as located, on a (k−1)-th manipulated image for training, by referring to one or more (k−1)-th object proposals for training on the (k−1)-th manipulated image for training, (2-2) if a k-th manipulated image for training is acquired which corresponds to the (k−1)-th target region for training on the training image or its resized images, instructing the convolutional layers to apply the convolution operations to the k-th manipulated image for training, to thereby generate a k-th feature map for training, (2-3) instructing the RPN to generate one or more k-th object proposals for training corresponding to each of one or more k-th objects for training on the k-th manipulated image for training by referring to the k-th feature map for training, (2-4) instructing the pooling layer to apply the pooling operations to each region, corresponding to each of the k-th object proposals for training, on the k-th feature map for training, to thereby generate at least one k-th pooled feature map for training, (2-5) instructing the FC layer to apply the fully connected operation to the k-th pooled feature map for training, to thereby generate k-th object detection information for training corresponding to the k-th objects for training, and (2-6) instructing the FC loss layer to generate one or more k-th FC losses by referring to the k-th object detection information for training and its corresponding GT, to thereby learn at least part of the parameters of the FC layer and the convolutional layers by backpropagating the k-th FC losses, by increasing k from 2 to n; a testing device, if at least one test image is acquired, (i) instructing the convolutional layers to generate at least one first feature map for testing by applying the convolution operations to at least one first manipulated image for testing corresponding to the test image, (ii) instructing the RPN to generate one or more first object proposals for testing corresponding to each of one or more first objects for testing in the first manipulated image for testing by using the first feature map for testing, (iii) instructing the pooling layer to apply the pooling operations to each region, corresponding to each of the first object proposals for testing, on the first feature map for testing, to thereby generate at least one first pooled feature map for testing, and (iv) instructing the FC layer to apply the fully connected operation to the first pooled feature map for testing, to thereby generate first object detection information for testing corresponding to the first objects for testing; and (b) the testing device (i) instructing the target object estimating network to search for a (k−1)-th target region for testing, corresponding to an area where at least one target object for testing is estimated as located, on a (k−1)-th manipulated image for testing, by referring to one or more (k−1)-th object proposals for testing on the (k−1)-th manipulated image for testing, (ii) if a k-th manipulated image for testing is acquired which corresponds to the (k−1)-th target region for testing on the test image or its resized images, instructing the convolutional layers to apply the convolution operations to the k-th manipulated image for testing, to thereby generate a k-th feature map for testing, (iii) instructing the RPN to generate one or more k-th object proposals for testing corresponding to each of one or more k-th objects for testing on the k-th manipulated image for testing by referring to the k-th feature map for testing, (iv) instructing the pooling layer to apply the pooling operations to each region, corresponding to each of the k-th object proposals for testing, on the k-th feature map for testing, to thereby generate at least one k-th pooled feature map for testing, and (v) instructing the FC layer to apply the fully connected operation to the k-th pooled feature map for testing, to thereby generate k-th object detection information for testing corresponding to the k-th objects for testing, by increasing k from 2 to n.

As one example, the learning device has instructed an RPN loss layer to calculate one or more first RPN losses by referring to information on the first object proposals for training and their corresponding GTs, to thereby adjust at least part of parameters of the RPN by backpropagating the first RPN losses, and the learning device has instructed the RPN loss layer to calculate one or more k-th RPN losses by referring to information on the k-th object proposals for training and their corresponding GTs, to thereby adjust at least part of the parameters of the RPN by backpropagating the k-th RPN losses.

As one example, at the step of (b), the testing device instructs the target object estimating network to (i) divide the (k−1)-th manipulated image for testing into an M×N grid, (ii) generate at least one histogram for testing representing the number of each corresponding proposals for testing, among the (k−1)-th object proposals for testing, per each cell of the grid, wherein each partial area or each whole area of said each corresponding proposals for testing is present in its corresponding cell of the grid, and (iii) determine the (k−1)-th target region for testing by using at least one region of a moving window, and wherein the at least one region has a largest value of summation of the histogram for testing among all regions to be occupied by changing a location of the moving window.

As one example, at the step of (b), the testing device generates the resized test image by enlarging a size of the test image into a size larger than that of the first manipulated image for testing, and crops at least one region, corresponding to the (k−1)-th target region for testing, on the resized test image, to thereby generate the k-th manipulated image for testing.

As one example, at the step of (b), the testing device crops at least one region, corresponding to the (k−1)-th target region for testing, on the test image, and resizes the cropped region, to thereby generate the k-th manipulated image for testing.

As one example, the k-th manipulated image for testing is resized such that a size of the k-th manipulated image for testing is larger than that of the (k−1)-th target region for testing.

As one example, sizes of the first manipulated image for testing to an n-th manipulated image for testing are determined as same.

In accordance with still another aspect of the present disclosure, there is provided a learning device for learning parameters of an object detector by using a target object estimating network, including: at least one memory that stores instructions; and at least one processor configured to execute the instructions to: perform processes of (I) (i) instructing one or more convolutional layers to generate at least one first feature map by applying one or more convolution operations to at least one first manipulated image corresponding to at least one training image, (ii) instructing an RPN to generate one or more first object proposals corresponding to each of one or more first objects in the first manipulated image by using the first feature map, (iii) instructing a pooling layer to apply one or more pooling operations to each region, corresponding to each of the first object proposals, on the first feature map, to thereby generate at least one first pooled feature map, (iv) instructing an FC layer to apply at least one fully connected operation to the first pooled feature map, to thereby generate first object detection information corresponding to the first objects, and (v) instructing an FC loss layer to generate one or more first FC losses by referring to the first object detection information and its corresponding GT, to thereby learn at least part of parameters of the FC layer and the convolutional layers by backpropagating the first FC losses, and (II) (i) instructing the target object estimating network to search for a (k−1)-th target region, corresponding to an area where at least one target object is estimated as located, on a (k−1)-th manipulated image, by referring to one or more (k−1)-th object proposals on the (k−1)-th manipulated image, (ii) if a k-th manipulated image is acquired which corresponds to the (k−1)-th target region on a resized training image or the training image, instructing the convolutional layers to apply the convolution operations to the k-th manipulated image, to thereby generate a k-th feature map, (iii) instructing the RPN to generate one or more k-th object proposals corresponding to each of one or more k-th objects on the k-th manipulated image by referring to the k-th feature map, (iv) instructing the pooling layer to apply the pooling operations to each region, corresponding to each of the k-th object proposals, on the k-th feature map, to thereby generate at least one k-th pooled feature map, (v) instructing the FC layer to apply the fully connected operation to the k-th pooled feature map, to thereby generate k-th object detection information corresponding to the k-th objects, and (vi) instructing the FC loss layer to generate one or more k-th FC losses by referring to the k-th object detection information and its corresponding GT, to thereby learn at least part of parameters of the FC layer and the convolutional layers by backpropagating the k-th FC losses, by increasing k from 2 to n.

As one example, at the process of (I), the processor instructs an RPN loss layer to calculate one or more first RPN losses by referring to information on the first object proposals and their corresponding GTs, to thereby adjust at least part of parameters of the RPN by backpropagating the first RPN losses, and, at the process of (II), the processor instructs the RPN loss layer to calculate one or more k-th RPN losses by referring to information on the k-th object proposals and their corresponding GTs, to thereby adjust at least part of the parameters of the RPN by backpropagating the k-th RPN losses.

As one example, at the process of (II), the processor instructs the target object estimating network to (i) divide the (k−1)-th manipulated image into an M×N grid, (ii) generate at least one histogram representing the number of each corresponding proposals, among the (k−1)-th object proposals, per each cell of the grid, wherein each partial area or each whole area of said each corresponding proposals is present in its corresponding cell of the grid, and (iii) determine the (k−1)-th target region by using at least one region of a moving window, and wherein the at least one region has a largest value of summation of the histogram among all regions to be occupied by changing a location of the moving window.

As one example, at the process of (II), the processor generates the resized training image by enlarging a size of the training image into a size larger than that of the first manipulated image, and crops at least one region, corresponding to the (k−1)-th target region, on the resized training image, to thereby generate the k-th manipulated image.

As one example, at the process of (II), the processor crops at least one region, corresponding to the (k−1)-th target region, on the training image, and resizes the cropped region, to thereby generate the k-th manipulated image.

As one example, the k-th manipulated image is resized such that a size of the k-th manipulated image is larger than that of the (k−1)-th target region.

As one example, sizes of the first manipulated image to an n-th manipulated image are determined as same.

In accordance with still yet another aspect of the present disclosure, there is provided a testing device for testing an object detector by using a target object estimating network, including: at least one memory that stores instructions; and at least one processor, on condition that a learning device has performed processes of (1-1) instructing one or more convolutional layers to generate at least one first feature map for training by applying one or more convolution operations to at least one first manipulated image for training corresponding to at least one training image, (1-2) instructing an RPN to generate one or more first object proposals for training corresponding to each of one or more first objects for training in the first manipulated image for training by using the first feature map for training, (1-3) instructing a pooling layer to apply one or more pooling operations to each region, corresponding to each of the first object proposals for training, on the first feature map for training, to thereby generate at least one first pooled feature map for training, (1-4) instructing an FC layer to apply at least one fully connected operation to the first pooled feature map for training, to thereby generate first object detection information for training corresponding to the first objects for training, and (1-5) instructing an FC loss layer to generate one or more first FC losses by referring to the first object detection information for training and its corresponding GT, to thereby learn at least part of parameters of the FC layer and the convolutional layers by backpropagating the first FC losses, and (2-1) instructing the target object estimating network to search for a (k−1)-th target region for training, corresponding to an area where at least one target object for training is estimated as located, on a (k−1)-th manipulated image for training, by referring to one or more (k−1)-th object proposals for training on the (k−1)-th manipulated image for training, (2-2) if a k-th manipulated image for training is acquired which corresponds to the (k−1)-th target region for training on the training image or its resized images, instructing the convolutional layers to apply the convolution operations to the k-th manipulated image for training, to thereby generate a k-th feature map for training, (2-3) instructing the RPN to generate one or more k-th object proposals for training corresponding to each of one or more k-th objects for training on the k-th manipulated image for training by referring to the k-th feature map for training, (2-4) instructing the pooling layer to apply the pooling operations to each region, corresponding to each of the k-th object proposals for training, on the k-th feature map for training, to thereby generate at least one k-th pooled feature map for training, (2-5) instructing the FC layer to apply the fully connected operation to the k-th pooled feature map for training, to thereby generate k-th object detection information for training corresponding to the k-th objects for training, and (2-6) instructing the FC loss layer to generate one or more k-th FC losses by referring to the k-th object detection information for training and its corresponding GT, to thereby learn at least part of the parameters of the FC layer and the convolutional layers by backpropagating the k-th FC losses, by increasing k from 2 to n; configured to execute the instructions to: perform processes of (I) (i) instructing the convolutional layers to generate at least one first feature map for testing by applying the convolution operations to at least one first manipulated image for testing corresponding to at least one test image, (ii) instructing the RPN to generate one or more first object proposals for testing corresponding to each of one or more first objects for testing in the first manipulated image for testing by using the first feature map for testing, (iii) instructing the pooling layer to apply the pooling operations to each region, corresponding to each of the first object proposals for testing, on the first feature map for testing, to thereby generate at least one first pooled feature map for testing, and (iv) instructing the FC layer to apply the fully connected operation to the first pooled feature map for testing, to thereby generate first object detection information for testing corresponding to the first objects for testing, and (II) (i) instructing the target object estimating network to search for a (k−1)-th target region for testing, corresponding to an area where at least one target object for testing is estimated as located, on a (k−1)-th manipulated image for testing, by referring to one or more (k−1)-th object proposals for testing on the (k−1)-th manipulated image for testing, (ii) if a k-th manipulated image for testing is acquired which corresponds to the (k−1)-th target region for testing on the test image or its resized images, instructing the convolutional layers to apply the convolution operations to the k-th manipulated image for testing, to thereby generate a k-th feature map for testing, (iii) instructing the RPN to generate one or more k-th object proposals for testing corresponding to each of one or more k-th objects for testing on the k-th manipulated image for testing by referring to the k-th feature map for testing, (iv) instructing the pooling layer to apply the pooling operations to each region, corresponding to each of the k-th object proposals for testing, on the k-th feature map for testing, to thereby generate at least one k-th pooled feature map for testing, and (v) instructing the FC layer to apply the fully connected operation to the k-th pooled feature map for testing, to thereby generate k-th object detection information for testing corresponding to the k-th objects for testing, by increasing k from 2 to n.

As one example, the learning device has instructed an RPN loss layer to calculate one or more first RPN losses by referring to information on the first object proposals for training and their corresponding GTs, to thereby adjust at least part of parameters of the RPN by backpropagating the first RPN losses, and the learning device has instructed the RPN loss layer to calculate one or more k-th RPN losses by referring to information on the k-th object proposals for training and their corresponding GTs, to thereby adjust at least part of the parameters of the RPN by backpropagating the k-th RPN losses.

As one example, at the process of (II), the processor instructs the target object estimating network to (i) divide the (k−1)-th manipulated image for testing into an M×N grid, (ii) generate at least one histogram for testing representing the number of each corresponding proposals for testing, among the (k−1)-th object proposals for testing, per each cell of the grid, wherein each partial area or each whole area of said each corresponding proposals for testing is present in its corresponding cell of the grid, and (iii) determine the (k−1)-th target region for testing by using at least one region of a moving window, and wherein the at least one region has a largest value of summation of the histogram for testing among all regions to be occupied by changing a location of the moving window.

As one example, at the process of (II), the processor generates the resized test image by enlarging a size of the test image into a size larger than that of the first manipulated image for testing, and crops at least one region, corresponding to the (k−1)-th target region for testing, on the resized test image, to thereby generate the k-th manipulated image for testing.

As one example, at the process of (II), the processor crops at least one region, corresponding to the (k−1)-th target region for testing, on the test image, and resizes the cropped region, to thereby generate the k-th manipulated image for testing.

As one example, the k-th manipulated image for testing is resized such that a size of the k-th manipulated image for testing is larger than that of the (k−1)-th target region for testing.

As one example, sizes of the first manipulated image for testing to an n-th manipulated image for testing are determined as same.

In addition, recordable media that are readable by a computer for storing a computer program to execute the method of the present disclosure is further provided.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

Figure 1:
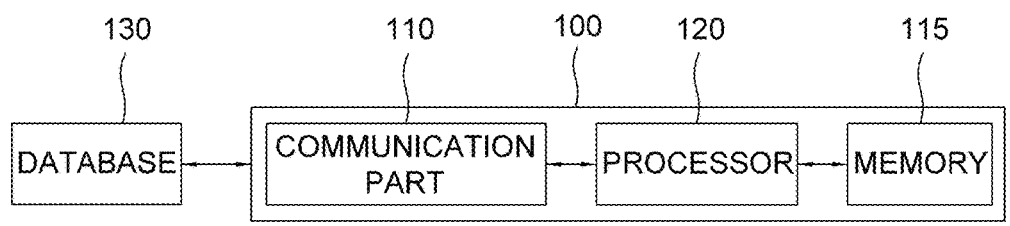

FIG. 1 is a drawing schematically illustrating a learning device for learning an object detector based on a CNN using a target object estimating network in accordance with one example embodiment of the present disclosure.

Figure 2:
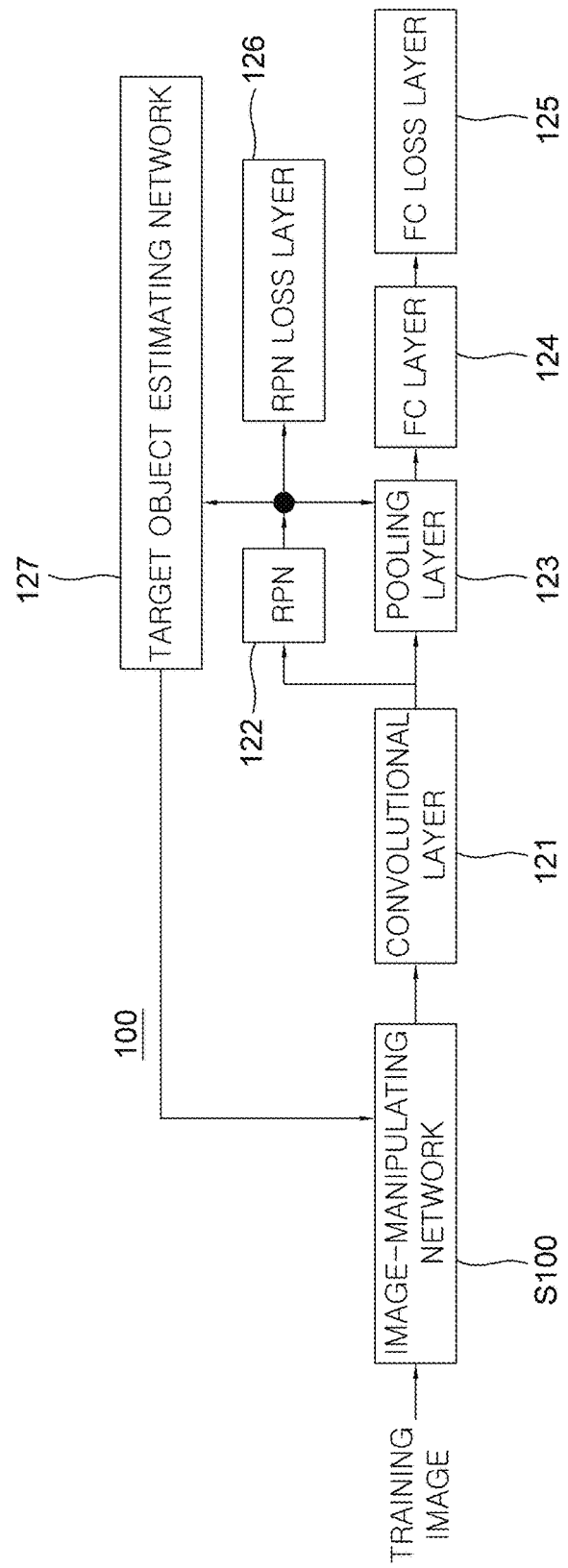

FIG. 2 is a drawing schematically illustrating a learning method for learning the object detector based on the CNN using the target object estimating network in accordance with one example embodiment of the present disclosure.

Figure 3:
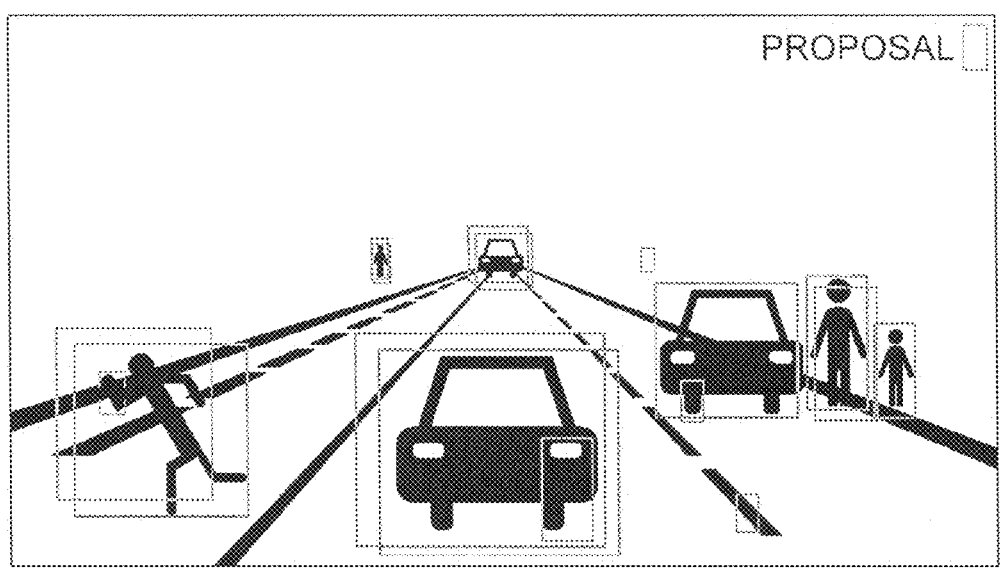

FIG. 3 is a drawing schematically illustrating object proposals, outputted from an RPN, to be considered for the learning method for the object detector based on the CNN using the target object estimating network in accordance with one example embodiment of the present disclosure.

Figure 4:
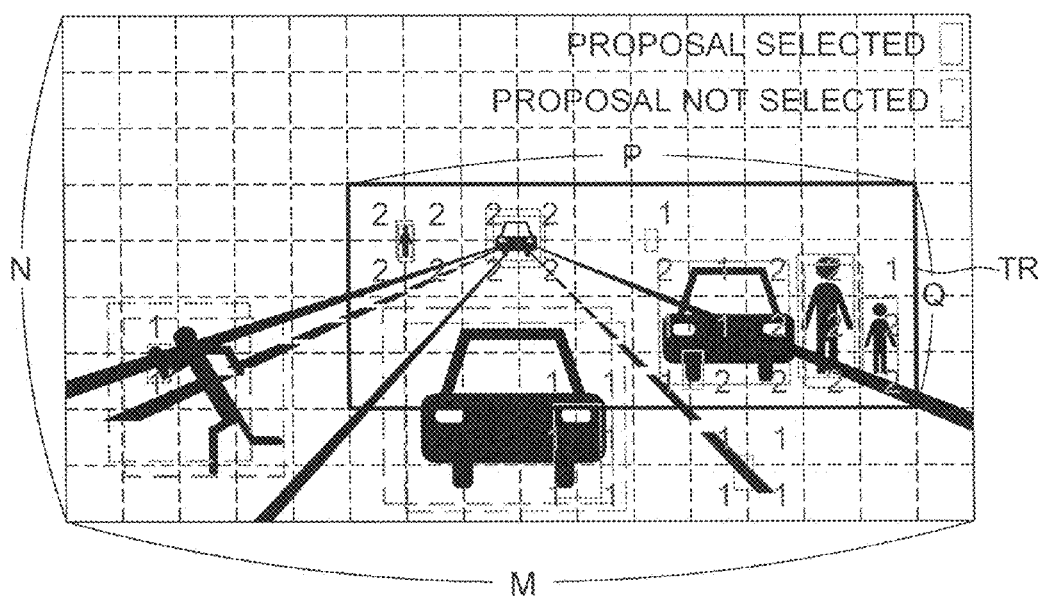

FIG. 4 is a drawing schematically illustrating a process of searching for target regions, by using the object proposals outputted from the RPN, to be considered for the learning method for the object detector based on the CNN using the target object estimating network in accordance with one example embodiment of the present disclosure.

Figure 5:
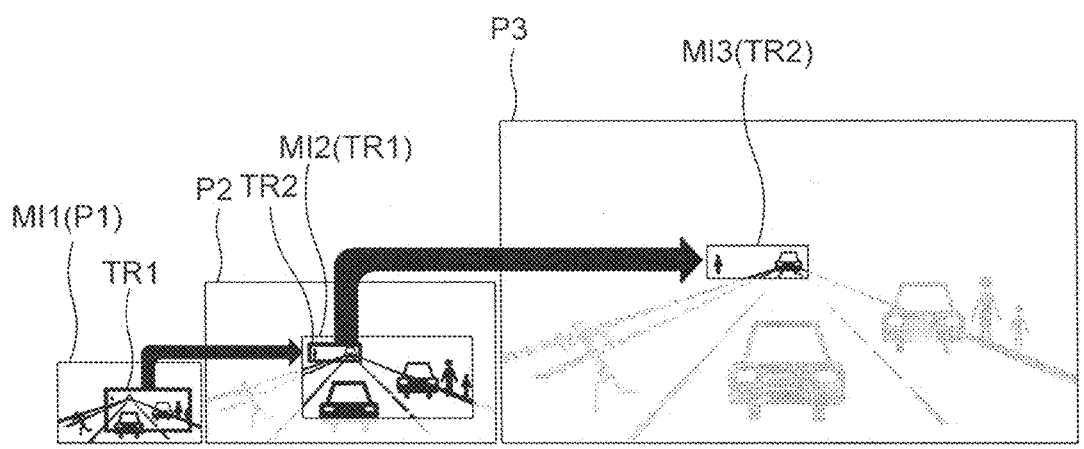

FIG. 5 is a drawing schematically illustrating a process of detecting at least one target object by using manipulated images in accordance with one example embodiment of the present disclosure.

Figure 6:
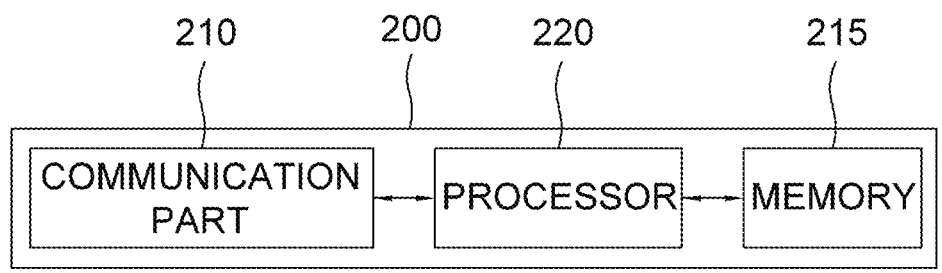

FIG. 6 is a drawing schematically illustrating a testing device for the object detector based on the CNN using the target object estimating network in accordance with one example embodiment of the present disclosure.

Figure 7:
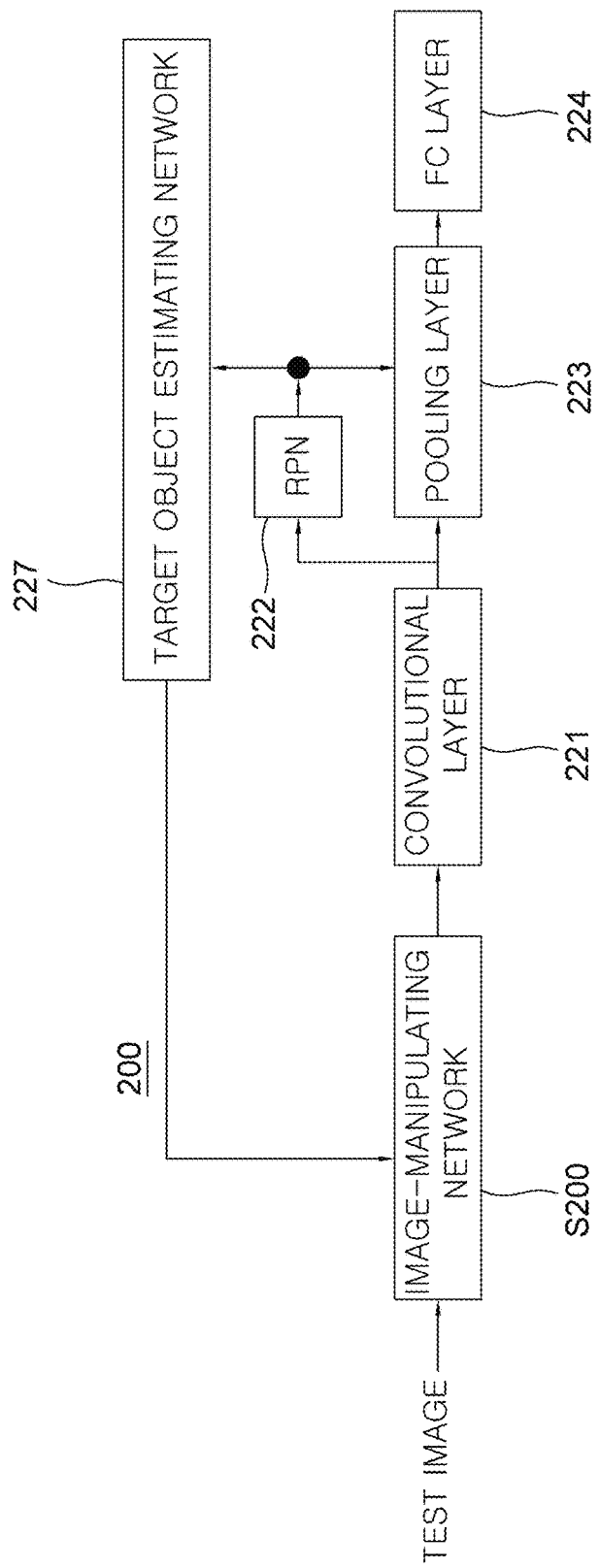

FIG. 7 is a drawing schematically illustrating a testing method for the object detector based on the CNN using the target object estimating network in accordance with one example embodiment of the present disclosure.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

FIG. 1 is a drawing schematically illustrating a learning device for learning an object detector based on a CNN using a target object estimating network in accordance with one example embodiment of the present disclosure.

By referring to FIG. 1, the learning device 100 may include a communication part 110 and a processor 120.

First, the communication part 110 may acquire or support another device to acquire at least one training image.

Herein, the training image may be stored in a database 130, and the database 130 may store at least one ground truth, i.e., GT, of class information and location information on each of one or more objects in the training images.

In addition, the learning device may further include a memory 115 capable of storing computer readable instructions for performing following processes. As one example, the processor, the memory, a medium, etc. may be integrated with an integrated processor.

Next, the processor 120 may perform or support another device to perform processes of (i) instructing one or more convolutional layers to generate at least one first feature map by applying one or more convolution operations to at least one first manipulated image corresponding to the training image, (ii) instructing an RPN (Region Proposal Network) to generate one or more first object proposals corresponding to each of one or more first objects in the first manipulated image by using the first feature map, (iii) instructing a pooling layer to apply one or more pooling operations to each region, corresponding to each of the first object proposals, on the first feature map, to thereby generate at least one first pooled feature map, (iv) instructing an FC layer to apply at least one fully connected operation to the first pooled feature map, to thereby generate first object detection information corresponding to the first objects, and (v) instructing an FC loss layer to generate one or more first FC losses by referring to the first object detection information and its corresponding GT, to thereby learn at least part of parameters of the FC layer and the convolutional layers by backpropagating the first FC losses. Then, the processor 120 may perform or support another device to perform processes of (i) instructing the target object estimating network to search for a (k−1)-th target region, corresponding to an area where at least one target object is estimated as located, on a (k−1)-th manipulated image, by referring to one or more (k−1)-th object proposals on the (k−1)-th manipulated image, (ii) if a k-th manipulated image is acquired which corresponds to the (k−1)-th target region on the training image or its resized images, instructing the convolutional layers to apply the convolution operations to the k-th manipulated image, to thereby generate a k-th feature map, (iii) instructing the RPN to generate one or more k-th object proposals corresponding to each of one or more k-th objects on the k-th manipulated image by referring to the k-th feature map, (iv) instructing the pooling layer to apply the pooling operations to each region, on the k-th feature map, corresponding to each of the k-th object proposals, to thereby generate at least one k-th pooled feature map, (v) instructing the FC layer to apply the fully connected operation to the k-th pooled feature map, to thereby generate k-th object detection information corresponding to the k-th objects, and (vi) instructing the FC loss layer to generate one or more k-th FC losses by referring to the k-th object detection information and its corresponding GT, to thereby learn at least part of parameters of the FC layer and the convolutional layers by backpropagating the k-th FC losses, by increasing k from 2 to n.

Also, the processor 120 may instruct an RPN loss layer to calculate one or more first RPN losses by referring to information on the first object proposals and their corresponding GTs, to thereby adjust at least part of parameters of the RPN by backpropagating the first RPN losses, and may instruct the RPN loss layer to calculate one or more k-th RPN losses by referring to information on the k-th object proposals and their corresponding GTs, to thereby adjust at least part of the parameters of the RPN by backpropagating the k-th RPN losses.

Herein, the learning device 100 in accordance with one example of the present disclosure may be a computing device, and may be any digital device with a processor capable of computation. For reference, although FIG. 1 shows the single learning device 100, the scope of the present disclosure is not limited thereto. For example, the learning device may be configured as several devices to perform its functions.

A method for learning parameters of the object detector based on the CNN using the target object estimating network by using the learning device 100 in accordance with one example embodiment of the present disclosure is described by referring to FIG. 2 as follows.

First of all, if the training image is inputted, the learning device 100 may instruct a convolutional layer 121 to apply the convolution operations to the first manipulated image corresponding to the training image, to thereby generate the first feature map. Herein, the convolutional layer 121 may be a single convolutional layer or multiple convolutional layers.

Herein, the learning device 100 may instruct an image-manipulating network 111 to generate an image pyramid including multiple images with different sizes which are created by manipulating the training image, and may input one image among the image pyramid into the convolutional layer 121 as the first manipulated image.

Next, the learning device 100 may instruct an RPN 122 to generate one or more first object proposals corresponding to the first objects in the first manipulated image by using the first feature map.

As one example, by referring to FIG. 3, the first object proposals outputted from the RPN 122 may correspond to each of the first objects in the first manipulated image, and each of the first object proposals may include information on each proposal box having location information corresponding to each of the first objects, i.e., a tagged area and information on whether it is an object. Herein, the information on whether it is an object may include probability information by which said each object proposal is estimated as an object, and information on the proposal box may include probability information by which the proposal box is estimated as matching the location of the object.

Next, the learning device 100 may instruct a pooling layer 123 to generate the first pooled feature map by applying the pooling operation to at least one region, corresponding to the first object proposals, on the first feature map, and may instruct an FC layer 124 to generate first object detection information corresponding to the first objects by applying the fully connected operation to the first pooled feature map.

Herein, the first object detection information may include information on bounding boxes, i.e., location information on each of the first objects, and class information on each of the first objects corresponding to the first object proposals. Also, the class information may include probability information by which each of the first objects is estimated as each class, and the information on the bounding boxes may include probability information by which each of the bounding boxes is estimated to match the location of the object.

Then, the learning device 100 may instruct at least one FC loss layer 125 to generate one or more first FC losses by referring to the first object detection information and its corresponding GT, to thereby adjust at least part of parameters of the FC layer 124 and the convolutional layer 121 by backpropagating the first FC losses.

Also, the learning device 100 may instruct at least one RPN loss layer 126 to generate one or more first RPN losses by referring to the first object proposals and their corresponding GTs, to thereby adjust at least part of parameters of the RPN 122 by backpropagating the first RPN losses.

Then, the learning device 100 may instruct a target object estimating network 127 to search for a first target region, corresponding to an area where the target object is estimated as located, on the first manipulated image, by referring to the first object proposals on the first manipulated image.

As one example, by referring to FIG. 4, the target object estimating network 127 may (i) divide the first manipulated image into an M×N grid, (ii) generate at least one histogram representing the number of each corresponding proposals, among the (k−1)-th object proposals, per each cell of the grid, wherein each partial area or each whole area of each of the corresponding proposals is present in its corresponding cell of the grid, where, preferably, the sizes of the corresponding proposals are smaller than a predetermined size corresponding to a size of the target object, among the object proposals outputted from the RPN 122 and (iii) determine the first target region TR by using at least one region of a moving window with a size of P×Q corresponding to a size of the first target region, where the at least one region has a largest value of summation of the histogram among all regions to be occupied by changing a location of the moving window.

Next, the learning device 100 may acquire or support another device to acquire a second manipulated image corresponding to the first target region TR on the training image or its resized image, i.e., a so-called resized training image.

Herein, the learning device 100 may instruct the image-manipulating network 111 to generate the resized training image by enlarging a size of the training image into a size larger than that of the first manipulated image, and crop at least one region, corresponding to the first target region TR, on the resized training image, to thereby generate the second manipulated image, or crop and resize at least one region, corresponding to the first target region TR, on the training image, to thereby generate the second manipulated image.

As one example, the image-manipulating network 111 may crop at least one region, corresponding to the first target region TR, on an image with a size larger than that of the first manipulated image among the image pyramid corresponding to the training image, to thereby generate the second manipulated image. Also, the image-manipulating network 111 may crop at least one region, on the training image, corresponding to the first target region TR and then may resize the cropped image, to thereby generate the second manipulated image. Herein, the second manipulated image may be resized such that its size is larger than that of the first target region. In order to do so, the image-manipulating network 111 may resize the cropped image to be corresponding to a size of a next image of the first manipulated image among the image pyramid of the training image, to thereby generate the second manipulated image.

Next, the learning device 100 may repeat the above processes using the generated second manipulated image, to thereby efficiently detect a small-sized object on the training image, that is, an object located in the long distance.

That is, the learning device 100 may perform or support another device to perform processes of (i) instructing the target object estimating network 127 to search for a (k−1)-th target region, corresponding to an area where the target object is estimated as located, on a (k−1)-th manipulated image, by referring to one or more (k−1)-th object proposals on the (k−1)-th manipulated image, (ii) if a k-th manipulated image is acquired which corresponds to the (k−1)-th target region on the training image or its resized training images, instructing the convolutional layers 121 to apply the convolution operations to the k-th manipulated image, to thereby generate a k-th feature map, by increasing k from 2 to n. Then, the learning device 100 may instruct the RPN 122 to generate k-th object proposals corresponding to each of the k-th objects in the k-th manipulated image by using the k-th feature map, and may instruct the pooling layer 123 to apply the pooling operations to each region, on the k-th feature map, corresponding to each of the k-th object proposals, to thereby generate at least one k-th pooled feature map. Thereafter, the learning device 100 may instruct the FC layer 124 to apply the fully connected operation to the k-th pooled feature map, to thereby generate k-th object detection information corresponding to the k-th objects. Then, the learning device 100 may instruct the FC loss layer 125 to generate one or more k-th FC losses by referring to the k-th object detection information and its corresponding GT, to thereby adjust at least part of parameters of the FC layer 125 and the convolutional layer 121 by backpropagating the k-th FC losses. Also, the learning device 100 may instruct the RPN loss layer 126 to generate one or more k-th RPN losses by referring to the k-th object proposals and their corresponding GTs, to thereby adjust at least part of the parameters of the RPN 122 by backpropagating the k-th RPN losses.

As one example, by referring to FIG. 5, object detection may be performed on the first manipulated image MI1, corresponding to a first image P1 which is a smallest-sized image among the image pyramid, and thus the first target region TR1 may be estimated, and object detection may be performed on the second manipulated image MI2, corresponding to the first target region TR1 on a second image P2 which is a next smallest-sized image among the image pyramid, and a second target region TR2 may be identified, and object detection may be performed on a third manipulated image MI3, corresponding to the second target region TR2 on a second image P3 which is a next smallest-sized image to the P2 among the image pyramid. Thus, as a result, k-th objects with specific sizes, preferably small-sized objects in the long distance, are easily detected thanks to less computational time.

Herein, sizes of the first target region to an (n−1)-th target region on the first manipulated image to an (n−1)-th manipulated image may be controlled to be the same, or each of the sizes may set to be different with each other according to each of sizes of the manipulated images while each of their corresponding aspect ratio is set as identical. Also, the sizes of the first manipulated image to the n-th manipulated image may be set as the same.

By using the method above, the k-th objects with various sizes on the training image, especially the k-th objects in the long distance which are small-sized, are detected efficiently. Also, computational load is reduced since only regions corresponding to the estimated target regions are used and thus computing time of the object detector based on the CNN is reduced.

Also, in the description so far, it is assumed that there is just one target object on the training image, however, even in case there are multiple target objects on the training image, detection of each of the target objects is possible by using each target region corresponding to each of the target objects on the training image as in the method mentioned above.

FIG. 6 is a drawing schematically illustrating a testing device for testing the object detector based on the CNN using the target object estimating network in accordance with one example embodiment of the present disclosure, and by referring to FIG. 6, the testing device 200 may include a communication part 210 and a processor 220.

First, the communication part 210 may acquire or support another device to acquire at least one test image.

In addition, the testing device may further include a memory 215 capable of storing computer readable instructions for performing following processes. As one example, the processor, the memory, a medium, etc. may be integrated with an integrated processor.

Herein, the object detector based on the CNN using the target object estimating network may have been learned by the learning method described by referring to FIGS. 1 to 5.

For reference, in the description below, the phrase "for training" is added for terms related to the learning processes, and the phrase "for testing" is added for terms related to testing processes, to avoid possible confusion.

That is, if a training image has been acquired, the learning device may have performed processes of (a) (i) instructing the convolutional layers to generate at least one first feature map for training by applying the convolution operations to at least one first manipulated image for training corresponding to the training image, (ii) instructing the RPN to generate one or more first object proposals for training corresponding to each of one or more first objects for training in the first manipulated image for training by using the first feature map for training, (iii) instructing the pooling layer to apply the pooling operations to each region, corresponding to each of the first object proposals for training, on the first feature map for training, to thereby generate at least one first pooled feature map for training, (iv) instructing the FC layer to apply the fully connected operation to the first pooled feature map for training, to thereby generate first object detection information for training corresponding to the first objects for training, and (v) instructing the FC loss layer to generate the first FC losses by referring to the first object detection information for training and its corresponding GT, to thereby learn at least part of the parameters of the FC layer and the convolutional layers by backpropagating the first FC losses; and (b) (i) instructing the target object estimating network to search for a (k−1)-th target region for training, corresponding to an area where at least one target object for training is estimated as located, on a (k−1)-th manipulated image for training, by referring to one or more (k−1)-th object proposals for training on the (k−1)-th manipulated image for training, (ii) if a k-th manipulated image for training is acquired which corresponds to the (k−1)-th target region on the training image or its resized images, instructing the convolutional layers to apply the convolution operations to the k-th manipulated image for training, to thereby generate a k-th feature map for training, (iii) instructing the RPN to generate one or more k-th object proposals for training corresponding to each of one or more k-th objects for training on the k-th manipulated image for training by referring to the k-th feature map for training, (iv) instructing the pooling layer to apply the pooling operations to each region, on the k-th feature map for training, corresponding to each of the k-th object proposals for training, to thereby generate at least one k-th pooled feature map for training, (v) instructing the FC layer to apply the fully connected operation to the k-th pooled feature map for training, to thereby generate k-th object detection information for training corresponding to the k-th objects for training, and (vi) instructing the FC loss layer to generate one or more k-th FC losses by referring to the k-th object detection information for training and its corresponding GT, to thereby learn at least part of the parameters of the FC layer and the convolutional layers by backpropagating the k-th FC losses, by increasing k from 2 to n.

Also, the learning device may have instructed the RPN loss layer to calculate one or more first RPN losses by referring to information on the first object proposals for training and their corresponding GTs, to thereby adjust at least part of the parameters of the RPN by backpropagating the first RPN losses, and may have instructed the RPN loss layer to calculate one or more k-th RPN losses by referring to information on the k-th object proposals for training and their corresponding GTs, to thereby adjust at least part of the parameters of the RPN by backpropagating the k-th RPN losses.

Next, the processor 220 may perform or support another device to perform processes of (i) instructing the convolutional layers to generate at least one first feature map for testing by applying the convolution operations to at least one first manipulated image for testing corresponding to the test image, (ii) instructing the RPN to generate one or more first object proposals for testing corresponding to each of one or more first objects for testing in the first manipulated image for testing by using the first feature map for testing, (iii) instructing the pooling layer to apply the pooling operations to each region, corresponding to each of the first object proposals for testing, on the first feature map for testing, to thereby generate at least one first pooled feature map for testing, (iv) instructing the FC layer to apply the fully connected operation to the first pooled feature map for testing, to thereby generate first object detection information for testing corresponding to the first objects for testing. Then, the processor 220 may perform or support another device to perform processes of (i) instructing the target object estimating network to search for a (k−1)-th target region for testing, corresponding to an area where at least one target object for testing is estimated as located, on a (k−1)-th manipulated image for testing, by referring to one or more (k−1)-th object proposals for testing on the (k−1)-th manipulated image for testing (ii) if a k-th manipulated image for testing is acquired which corresponds to the (k−1)-th target region for testing on the test image or its resized images, instructing the convolutional layers to apply the convolution operations to the k-th manipulated image for testing, to thereby generate a k-th feature map for testing, (iii) instructing the RPN to generate one or more k-th object proposals for testing corresponding to each of one or more k-th objects for testing on the k-th manipulated image for testing by referring to the k-th feature map for testing, (iv) instructing the pooling layer to apply the pooling operations to each region, on the k-th feature map for testing, corresponding to each of the k-th object proposals for testing, to thereby generate at least one k-th pooled feature map for testing, (v) instructing the FC layer to apply the fully connected operation to the k-th pooled feature map for testing, to thereby generate k-th object detection information for testing corresponding to the k-th objects for testing, by increasing k from 2 to n.

Herein, the testing device 200 in accordance with one example embodiment of the present disclosure may be a computing device, and may be any device with a processor capable of computation. For reference, although FIG. 6 shows the single testing device 200, but the scope of the present disclosure is not limited thereto. For example, the testing device may be configured as several devices to perform its functions.

A method for testing the object detector based on the CNN using the target object estimating network by using the testing device 200 in accordance with one example embodiment of the present disclosure is described by referring to FIG. 7 as follows. In the description below, the part easily deducible from the learning method described by referring to FIGS. 1 to 5 will be omitted.

First, on condition that at least part of parameters of an FC layer 224, a convolutional layer 221, and an RPN 222 has been learned according to the learning method described by referring to FIGS. 1 to 5, if the test image is inputted, the testing device 200 may instruct the convolutional layer 221 to apply the convolution operations to the first manipulated image for testing corresponding to the test image, to thereby generate the first feature map for testing. Herein, the convolutional layer 221 may be a single convolutional layer or multiple convolutional layers.

Herein, the testing device 200 may instruct an image-manipulating network 211 to generate an image pyramid including images with different sizes which are created by manipulating the test image, and may input one image among the image pyramid into the convolutional layer 221 as the first manipulated image for testing.

Next, the testing device 200 may instruct the RPN 222 to generate one or more first object proposals for testing corresponding to each of the first objects for testing in the first manipulated image for testing by using the first feature map for testing.

Herein, each of the first object proposals for testing may include information on each proposal box for testing having location information corresponding to each of the first objects for testing, i.e., a tagged area and information on whether it is an object.

Next, the testing device 200 may instruct a pooling layer 223 to generate at least one first pooled feature map for testing by applying the pooling operations to at least one region corresponding to the first object proposals for testing on the first feature map for testing, and may instruct the FC layer 224 to generate first object detection information for testing corresponding to the first objects for testing by applying the fully connected operation to the first pooled feature map for testing.

Herein, the first object detection information for testing may include information on bounding boxes for testing, i.e., location information on each of the first objects for testing, and class information on each of the first objects for testing corresponding to the first object proposals for testing.

Then, the testing device 200 may instruct a target object estimating network 227 to search for a first target region for testing, corresponding to an area where at least one target object for testing is estimated as located, on the first manipulated image for testing, by referring to the first object proposals for testing on the first manipulated image for testing.

Next, the testing device 200 may acquire or support another device to acquire a second manipulated image for testing corresponding to the first target region for testing on the resized test image or the test image.

Herein, the testing device 200 may instruct the image-manipulating network 211 to generate the resized test image by enlarging a size of the test image into a size larger than that of the first manipulated image for testing, and crop at least one region, corresponding to the first target region for testing, on the resized test image, to thereby generate the second manipulated image for testing, or crop and resize at least one region, corresponding to the first target region for testing, on the test image, to thereby generate the second manipulated image for testing.

As one example, the image-manipulating network 211 may crop at least one region, corresponding to the first target region for testing, on an image with a size larger than that of the first manipulated image for testing among the image pyramid corresponding to the test image, to thereby generate the second manipulated image for testing. Also, the image-manipulating network 211 may crop at least one region, corresponding to the first target region for testing, and resize the cropped image, on the test image, to thereby generate the second manipulated image for testing. Herein, the second manipulated image for testing may be resized such that its size is larger than that of the first target region for testing. In order to do so, the image-manipulating network 211 may resize an image cropped to be corresponding to a size of a next image of the first manipulated image for testing among the image pyramid of the test image, to thereby generate the second manipulated image for testing.

Next, the testing device 200 may repeat the above processes using the generated second manipulated image for testing, to thereby efficiently detect a small-sized object on the test image, that is, an object located in the long distance.

That is, the testing device 200 may perform or support another device to perform processes of (i) instructing the target object estimating network 227 to search for a (k−1)-th target region for testing, corresponding to an area where at least one target object for testing is estimated as located, on a (k−1)-th manipulated image for testing, by referring to one or more (k−1)-th object proposals for testing on the (k−1)-th manipulated image for testing, (ii) if a k-th manipulated image for testing is acquired which corresponds to the (k−1)-th target region for testing on the test image or its resized images, instructing the convolutional layer 221 to apply the convolution operations to the k-th manipulated image for testing, to thereby generate a k-th feature map for testing, by increasing k from 2 to n. Then, the testing device 200 may instruct the RPN 222 to generate k-th object proposals for testing corresponding to each of the k-th objects for testing in the k-th manipulated image for testing by using the k-th feature map for testing, and may instruct the pooling layer 223 to apply the pooling operations to each region, corresponding to each of the k-th object proposals for testing, on the k-th feature map for testing, to thereby generate at least one k-th pooled feature map for testing. Thereafter, the testing device 200 may instruct the FC layer 224 to apply the fully connected operation to the k-th pooled feature map for testing, to thereby generate k-th object detection information for testing corresponding to the k-th objects for testing.

By using the method above, the k-th objects with various sizes on the test image, especially the k-th objects in the long distance which are small-sized, are detected efficiently. Also, computational load is reduced since only regions corresponding to the estimated target regions are used and thus computation time of the object detector based on the CNN is reduced.

Also, in the description so far, it is assumed that there is just one target object on the test image, however, in case there are multiple target objects on the test image, detection of each of the target objects is possible by using each target region corresponding to each of the target objects on the test image as in the method mentioned above.

The present disclosure has an effect of detecting small objects in an image with ease by using target regions where objects are estimated as located on each of the manipulated images that are images with various sizes into which the input image is transformed.

The present disclosure has another effect of minimizing computational load and time by detecting small objects in an image with ease by using manipulated images, i.e., the cropped target regions where objects are estimated as located on each of the manipulated images that are images with various sizes into which the input image is transformed.

By learning parameters of an object detector, a target object estimating network adaptable to customers' requirements such as KPI (key performance index) can be provided. When a focal length or a resolution changes depending on the KPI, scales of objects also change. In the method for customer optimizable design, unsecure objects such as falling or fallen objects may be detected more accurately, and also fluctuations of the objects may be detected. Therefore, the method can be usefully performed for military purpose or for detection of the objects at distance.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for learning parameters of an object detector by using a target object estimating network, comprising steps of:
   (a) a learning device, if at least one training image is acquired, (i) instructing one or more convolutional layers to generate at least one first feature map by applying one or more convolution operations to at least one first manipulated image corresponding to the training image, (ii) instructing an RPN to generate one or more first object proposals corresponding to each of one or more first objects in the first manipulated image by using the first feature map, (iii) instructing a pooling layer to apply one or more pooling operations to each region, corresponding to each of the first object proposals, on the first feature map, to thereby generate at least one first pooled feature map, (iv) instructing an FC layer to apply at least one fully connected operation to the first pooled feature map, to thereby generate first object detection information corresponding to the first objects, and (v) instructing an FC loss layer to generate one or more first FC losses by referring to the first object detection information and its corresponding GT, to thereby learn at least part of parameters of the FC layer and the convolutional layers by backpropagating the first FC losses; and
   (b) the learning device (i) instructing the target object estimating network to search for a (k−1)-th target region, corresponding to an area where at least one target object is estimated as located, on a (k−1)-th manipulated image, by referring to one or more (k−1)-th object proposals on the (k−1)-th manipulated image, (ii) if a k-th manipulated image is acquired which corresponds to the (k−1)-th target region on a resized training image or the training image, instructing the convolutional layers to apply the convolution operations to the k-th manipulated image, to thereby generate a k-th feature map, (iii) instructing the RPN to generate one or more k-th object proposals corresponding to each of one or more k-th objects on the k-th manipulated image by referring to the k-th feature map, (iv) instructing the pooling layer to apply the pooling operations to each region, corresponding to each of the k-th object proposals, on the k-th feature map, to thereby generate at least one k-th pooled feature map, (v) instructing the FC layer to apply the fully connected operation to the k-th pooled feature map, to thereby generate k-th object detection information corresponding to the k-th objects, and (vi) instructing the FC loss layer to generate one or more k-th FC losses by referring to the k-th object detection information and its corresponding GT, to thereby learn at least part of parameters of the FC layer and the convolutional layers by backpropagating the k-th FC losses, by increasing k from 2 to n.

2. The method of claim 1, wherein, at the step of (a), the learning device instructs an RPN loss layer to calculate one or more first RPN losses by referring to information on the first object proposals and their corresponding GTs, to thereby adjust at least part of parameters of the RPN by backpropagating the first RPN losses, and wherein, at the step of (b), the learning device instructs the RPN loss layer to calculate one or more k-th RPN losses by referring to information on the k-th object proposals and their corresponding GTs, to thereby adjust at least part of the parameters of the RPN by backpropagating the k-th RPN losses.

3. The method of claim 1, wherein, at the step of (b), the learning device instructs the target object estimating network to (i) divide the (k−1)-th manipulated image into an M×N grid, (ii) generate at least one histogram representing the number of each corresponding proposals, among the (k−1)-th object proposals, per each cell of the grid, wherein each partial area or each whole area of said each corresponding proposals is present in its corresponding cell of the grid, and (iii) determine the (k−1)-th target region by using at least one region of a moving window, and wherein the at least one region has a largest value of summation of the histogram among all regions to be occupied by changing a location of the moving window.

4. The method of claim 1, wherein, at the step of (b), the learning device generates the resized training image by enlarging a size of the training image into a size larger than that of the first manipulated image, and crops at least one region, corresponding to the (k−1)-th target region, on the resized training image, to thereby generate the k-th manipulated image.

5. The method of claim 1, wherein, at the step of (b), the learning device crops at least one region, corresponding to the (k−1)-th target region, on the training image, and resizes the cropped region, to thereby generate the k-th manipulated image.

6. The method of claim 5, wherein the k-th manipulated image is resized such that a size of the k-th manipulated image is larger than that of the (k−1)-th target region.

7. The method of claim 1, wherein sizes of the first manipulated image to an n-th manipulated image are determined as same.

8. A method for testing an object detector by using a target object estimating network, comprising steps of:

(a) on condition that a learning device has performed processes of (1-1) instructing one or more convolutional layers to generate at least one first feature map for training by applying one or more convolution operations to at least one first manipulated image for training corresponding to at least one training image, (1-2) instructing an RPN to generate one or more first object proposals for training corresponding to each of one or more first objects for training in the first manipulated image for training by using the first feature map for training, (1-3) instructing a pooling layer to apply one or more pooling operations to each region, corresponding to each of the first object proposals for training, on the first feature map for training, to thereby generate at least one first pooled feature map for training, (1-4) instructing an FC layer to apply at least one fully connected operation to the first pooled feature map for training, to thereby generate first object detection information for training corresponding to the first objects for training, and (1-5) instructing an FC loss layer to generate one or more first FC losses by referring to the first object detection information for training and its corresponding GT, to thereby learn at least part of parameters of the FC layer and the convolutional layers by backpropagating the first FC losses, and (2-1) instructing the target object estimating network to search for a (k−1)-th target region for training, corresponding to an area where at least one target object for training is estimated as located, on a (k−1)-th manipulated image for training, by referring to one or more (k−1)-th object proposals for training on the (k−1)-th manipulated image for training, (2-2) if a k-th manipulated image for training is acquired which corresponds to the (k−1)-th target region for training on the training image or its resized images, instructing the convolutional layers to apply the convolution operations to the k-th manipulated image for training, to thereby generate a k-th feature map for training, (2-3) instructing the RPN to generate one or more k-th object proposals for training corresponding to each of one or more k-th objects for training on the k-th manipulated image for training by referring to the k-th feature map for training, (2-4) instructing the pooling layer to apply the pooling operations to each region, corresponding to each of the k-th object proposals for training, on the k-th feature map for training, to thereby generate at least one k-th pooled feature map for training, (2-5) instructing the FC layer to apply the fully connected operation to the k-th pooled feature map for training, to thereby generate k-th object detection information for training corresponding to the k-th objects for training, and (2-6) instructing the FC loss layer to generate one or more k-th FC losses by referring to the k-th object detection information for training and its corresponding GT, to thereby learn at least part of the parameters of the FC layer and the convolutional layers by backpropagating the k-th FC losses, by increasing k from 2 to n; a testing device, if at least one test image is acquired, (i) instructing the convolutional layers to generate at least one first feature map for testing by applying the convolution operations to at least one first manipulated image for testing corresponding to the test image, (ii) instructing the RPN to generate one or more first object proposals for testing corresponding to each of one or more first objects for testing in the first manipulated image for testing by using the first feature map for testing, (iii) instructing the pooling layer to apply the pooling operations to each region, corresponding to each of the first object proposals for testing, on the first feature map for testing, to thereby generate at least one first pooled feature map for testing, and (iv) instructing the FC layer to apply the fully connected operation to the first pooled feature map for testing, to thereby generate first object detection information for testing corresponding to the first objects for testing; and (b) the testing device (i) instructing the target object estimating network to search for a (k−1)-th target region for testing, corresponding to an area where at least one target object for testing is estimated as located, on a (k−1)-th manipulated image for testing, by referring to one or more (k−1)-th object proposals for testing on the (k−1)-th manipulated image for testing, (ii) if a k-th manipulated image for testing is acquired which corresponds to the (k−1)-th target region for testing on the test image or its resized images, instructing the convolutional layers to apply the convolution operations to the k-th manipulated image for testing, to thereby generate a k-th feature map for testing, (iii) instructing the RPN to generate one or more k-th object proposals for testing corresponding to each of one or more k-th objects for testing on the k-th manipulated image for testing by referring to the k-th feature map for testing, (iv) instructing the pooling layer to apply the pooling operations to each region, corresponding to each of the k-th object proposals for testing, on the k-th feature map for testing, to thereby generate at least one k-th pooled feature map for testing, and (v) instructing the FC layer to apply the fully connected operation to the k-th pooled feature map for testing, to thereby generate k-th object detection information for testing corresponding to the k-th objects for testing, by increasing k from 2 to n.

9. The method of claim 8, wherein the learning device has instructed an RPN loss layer to calculate one or more first RPN losses by referring to information on the first object proposals for training and their corresponding GTs, to thereby adjust at least part of parameters of the RPN by backpropagating the first RPN losses, and
wherein the learning device has instructed the RPN loss layer to calculate one or more k-th RPN losses by referring to information on the k-th object proposals for training and their corresponding GTs, to thereby adjust at least part of the parameters of the RPN by backpropagating the k-th RPN losses.

10. The method of claim 8, wherein, at the step of (b), the testing device instructs the target object estimating network to (i) divide the (k−1)-th manipulated image for testing into an M×N grid, (ii) generate at least one histogram for testing representing the number of each corresponding proposals for testing, among the (k−1)-th object proposals for testing, per each cell of the grid, wherein each partial area or each whole area of said each corresponding proposals for testing is present in its corresponding cell of the grid, and (iii) determine the (k−1)-th target region for testing by using at least one region of a moving window, and wherein the at least one region has a largest value of summation of the histogram for testing among all regions to be occupied by changing a location of the moving window.

11. The method of claim 8, wherein, at the step of (b), the testing device generates the resized test image by enlarging a size of the test image into a size larger than that of the first manipulated image for testing, and crops at least one region, corresponding to the (k−1)-th target region for testing, on the resized test image, to thereby generate the k-th manipulated image for testing.

12. The method of claim 8, wherein, at the step of (b), the testing device crops at least one region, corresponding to the (k−1)-th target region for testing, on the test image, and resizes the cropped region, to thereby generate the k-th manipulated image for testing.

13. The method of claim 12, wherein the k-th manipulated image for testing is resized such that a size of the k-th manipulated image for testing is larger than that of the (k−1)-th target region for testing.

14. The method of claim 8, wherein sizes of the first manipulated image for testing to an n-th manipulated image for testing are determined as same.

15. A learning device for learning parameters of an object detector by using a target object estimating network, comprising:
at least one memory that stores instructions; and
at least one processor configured to execute the instructions to: perform processes of (I) (i) instructing one or more convolutional layers to generate at least one first feature map by applying one or more convolution operations to at least one first manipulated image corresponding to at least one training image, (ii) instructing an RPN to generate one or more first object proposals corresponding to each of one or more first objects in the first manipulated image by using the first feature map, (iii) instructing a pooling layer to apply one or more pooling operations to each region, corresponding to each of the first object proposals, on the first feature map, to thereby generate at least one first pooled feature map, (iv) instructing an FC layer to apply at least one fully connected operation to the first pooled feature map, to thereby generate first object detection information corresponding to the first objects, and (v) instructing an FC loss layer to generate one or more first FC losses by referring to the first object detection information and its corresponding GT, to thereby learn at least part of parameters of the FC layer and the convolutional layers by backpropagating the first FC losses, and (II) (i) instructing the target object estimating network to search for a (k−1)-th target region, corresponding to an area where at least one target object is estimated as located, on a (k−1)-th manipulated image, by referring to one or more (k−1)-th object proposals on the (k−1)-th manipulated image, (ii) if a k-th manipulated image is acquired which corresponds to the (k−1)-th target region on a resisted training image or the training image, instructing the convolutional layers to apply the convolution operations to the k-th manipulated image, to thereby generate a k-th feature map, (iii) instructing the RPN to generate one or more k-th object proposals corresponding to each of one or more k-th objects on the k-th manipulated image by referring to the k-th feature map, (iv) instructing the pooling layer to apply the pooling operations to each region, corresponding to each of the k-th object proposals, on the k-th feature map, to thereby generate at least one k-th pooled feature map, (v) instructing the FC layer to apply the fully connected operation to the k-th pooled feature map, to thereby generate k-th object detection information corresponding to the k-th objects, and (vi) instructing the FC loss layer to generate one or more k-th FC losses by referring to the k-th object detection information and its corresponding GT, to thereby learn at least part of parameters of the FC layer and the convolutional layers by backpropagating the k-th FC losses, by increasing k from 2 to n.

16. The learning device of claim 15, wherein, at the process of (I), the processor instructs an RPN loss layer to calculate one or more first RPN losses by referring to information on the first object proposals and their corresponding GTs, to thereby adjust at least part of parameters of the RPN by backpropagating the first RPN losses, and
wherein, at the process of (II), the processor instructs the RPN loss layer to calculate one or more k-th RPN losses by referring to information on the k-th object proposals and their corresponding GTs, to thereby adjust at least part of the parameters of the RPN by backpropagating the k-th RPN losses.

17. The learning device of claim 15, wherein, at the process of (II), the processor instructs the target object estimating network to (i) divide the (k−1)-th manipulated image into an M×N grid, (ii) generate at least one histogram representing the number of each corresponding proposals, among the (k−1)-th object proposals, per each cell of the grid, wherein each partial area or each whole area of said each corresponding proposals is present in its corresponding cell of the grid, and (iii) determine the (k−1)-th target region by using at least one region of a moving window, and wherein the at least one region has a largest value of summation of the histogram among all regions to be occupied by changing a location of the moving window.

18. The learning device of claim 15, wherein, at the process of (II), the processor generates the resized training image by enlarging a size of the training image into a size larger than that of the first manipulated image, and crops at least one region, corresponding to the (k−1)-th target region, on the resized training image, to thereby generate the k-th manipulated image.

19. The learning device of claim 15, wherein, at the process of (II), the processor crops at least one region, corresponding to the (k−1)-th target region, on the training image, and resizes the cropped region, to thereby generate the k-th manipulated image.

20. The learning device of claim 19, wherein the k-th manipulated image is resized such that a size of the k-th manipulated image is larger than that of the (k−1)-th target region.

21. The learning device of claim 15, wherein sizes of the first manipulated image to an n-th manipulated image are determined as same.

22. A testing device for testing an object detector by using a target object estimating network, comprising:
at least one memory that stores instructions; and
at least one processor, on condition that a learning device has performed processes of (1-1) instructing one or more convolutional layers to generate at least one first feature map for training by applying one or more convolution operations to at least one first manipulated image for training corresponding to at least one training image, (1-2) instructing an RPN to generate one or more first object proposals for training corresponding to each of one or more first objects for training in the first manipulated image for training by using the first feature map for training, (1-3) instructing a pooling layer to apply one or more pooling operations to each region, corresponding to each of the first object proposals for training, on the first feature map for training, to thereby generate at least one first pooled feature map for training, (1-4) instructing an FC layer to apply at least one fully connected operation to the first pooled feature map for training, to thereby generate first object detection information for training corresponding to the first objects for training, and (1-5) instructing an FC loss layer to generate one or more first FC losses by referring to the first object detection information for training and its corresponding GT, to thereby learn at least part of parameters of the FC layer and the convolutional layers by backpropagating the first FC losses, and (2-1) instructing the target object estimating network to search for a (k−1)-th target region for training, corresponding to an area where at least one target object for training is estimated as located, on a (k−1)-th manipulated image for training, by referring to one or more (k−1)-th object proposals for training on the (k−1)-th manipulated image for training, (2-2) if a k-th manipulated image for training is acquired which corresponds to the (k−1)-th target region for training on the training image or its resized images, instructing the convolutional layers to apply the convolution operations to the k-th manipulated image for training, to thereby generate a k-th feature map for training, (2-3) instructing the RPN to generate one or more k-th object proposals for training corresponding to each of one or more k-th objects for training on the k-th manipulated image for training by referring to the k-th feature map for training, (2-4) instructing the pooling layer to apply the pooling operations to each region, corresponding to each of the k-th object proposals for training, on the k-th feature map for training, to thereby generate at least one k-th pooled feature map for training, (2-5) instructing the FC layer to apply the fully connected operation to the k-th pooled feature map for training, to thereby generate k-th object detection information for training corresponding to the k-th objects for training, and (2-6) instructing the FC loss layer to generate one or more k-th FC losses by referring to the k-th object detection information for training and its corresponding GT, to thereby learn at least part of the parameters of the FC layer and the convolutional layers by backpropagating the k-th FC losses, by increasing k from 2 to n; configured to execute the instructions to: perform processes of (I) (i) instructing the convolutional layers to generate at least one first feature map for testing by applying the convolution operations to at least one first manipulated image for testing corresponding to at least one test image, (ii) instructing the RPN to generate one or more first object proposals for testing corresponding to each of one or more first objects for testing in the first manipulated image for testing by using the first feature map for testing, (iii) instructing the pooling layer to apply the pooling operations to each region, corresponding to each of the first object proposals for testing, on the first feature map for testing, to thereby generate at least one first pooled feature map for testing, and (iv) instructing the FC layer to apply the fully connected operation to the first pooled feature map for testing, to thereby generate first object detection information for testing corresponding to the first objects for testing, and (II) (i) instructing the target object estimating network to search for a (k−1)-th target region for testing, corresponding to an area where at least one target object for testing is estimated as located, on a (k−1)-th manipulated image for testing, by referring to one or more (k−1)-th object proposals for testing on the (k−1)-th manipulated image for testing, (ii) if a k-th manipulated image for testing is acquired which corresponds to the (k−1)-th target region for testing on the test image or its resized images, instructing the convolutional layers to apply the convolution operations to the k-th manipulated image for testing, to thereby generate a k-th feature map for testing, (iii) instructing the RPN to generate one or more k-th object proposals for testing corresponding to each of one or more k-th objects for testing on the k-th manipulated image for testing by referring to the k-th feature map for testing, (iv) instructing the pooling layer to apply the pooling operations to each region, corresponding to each of the k-th object proposals for testing, on the k-th feature map for testing, to thereby generate at least one k-th pooled feature map for testing, and (v) instructing the FC layer to apply the fully connected operation to the k-th pooled feature map for testing, to thereby generate k-th object detection information for testing corresponding to the k-th objects for testing, by increasing k from 2 to n.

23. The testing device of claim 22, wherein the learning device has instructed an RPN loss layer to calculate one or more first RPN losses by referring to information on the first object proposals for training and their corresponding GTs, to thereby adjust at least part of parameters of the RPN by backpropagating the first RPN losses, and
wherein the learning device has instructed the RPN loss layer to calculate one or more k-th RPN losses by referring to information on the k-th object proposals for training and their corresponding GTs, to thereby adjust at least part of the parameters of the RPN by back-propagating the k-th RPN losses.

24. The testing device of claim 22, wherein, at the process of (II), the processor instructs the target object estimating network to (i) divide the (k−1)-th manipulated image for testing into an M×N grid, (ii) generate at least one histogram for testing representing the number of each corresponding proposals for testing, among the (k−1)-th object proposals for testing, per each cell of the grid, wherein each partial area or each whole area of said each corresponding proposals for testing is present in its corresponding cell of the grid, and (iii) determine the (k−1)-th target region for testing by using at least one region of a moving window, and wherein the at least one region has a largest value of summation of the histogram for testing among all regions to be occupied by changing a location of the moving window.

25. The testing device of claim 22, wherein, at the process of (II), the processor generates the resized test image by enlarging a size of the test image into a size larger than that of the first manipulated image for testing, and crops at least one region, corresponding to the (k−1)-th target region for testing, on the resized test image, to thereby generate the k-th manipulated image for testing.

26. The testing device of claim 22, wherein, at the process of (II), the processor crops at least one region, corresponding to the (k−1)-th target region for testing, on the test image, and resizes the cropped region, to thereby generate the k-th manipulated image for testing.

27. The testing device of claim 26, wherein the k-th manipulated image for testing is resized such that a size of the k-th manipulated image for testing is larger than that of the (k−1)-th target region for testing.

28. The testing device of claim 22, wherein sizes of the first manipulated image for testing to an n-th manipulated image for testing are determined as same.

* * * * *